April 22, 1924.  
B. GOLDMAN  
SPEEDOMETER  
Filed Dec. 31, 1921
1,491,347
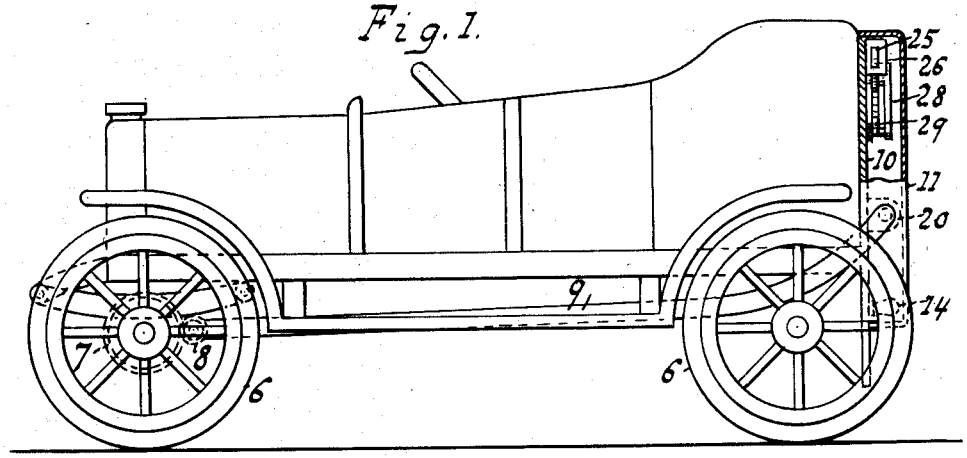
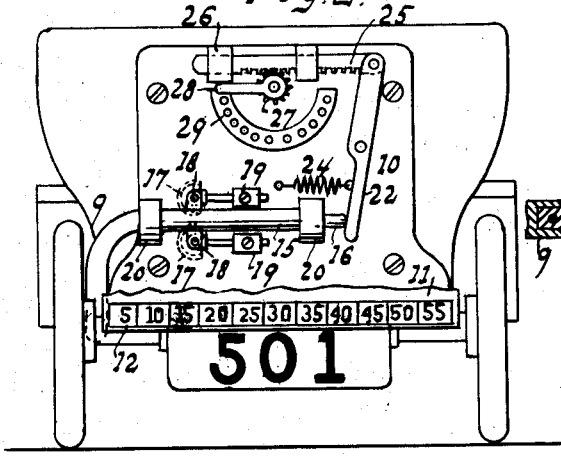
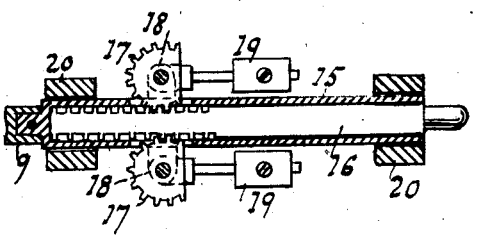
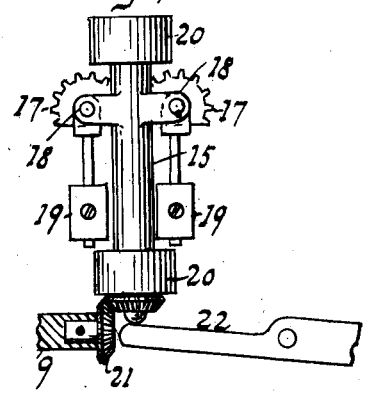
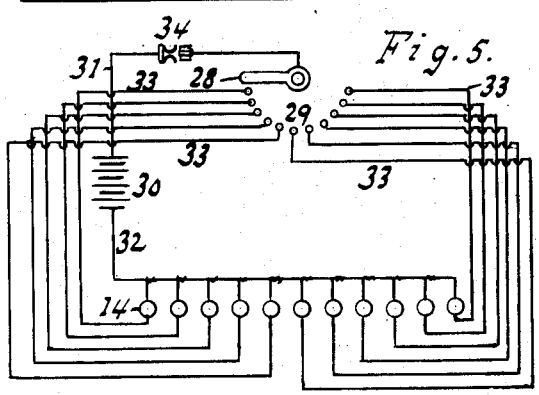
INVENTOR  
*Barney Goldman*  
BY  
ATTORNEYS Patented Apr. 22, 1924.

1,491,347

UNITED STATES PATENT OFFICE.

BARNEY GOLDMAN, OF NEW YORK, N. Y.

SPEEDOMETER.

Application filed December 31, 1921. Serial No. 526,308.

*To all whom it may concern:*

Be it known that I, BARNEY GOLDMAN, a citizen of the United States, residing at New York, in the county of New York and State of New York, have invented new and useful Improvements in Speedometers, of which the following is a specification.

This invention relates essentially to a signal located at any desired place on the vehicle and visible at a distance either by day or night for indicating the speed at which the vehicle is travelling.

An object of the invention is to provide devices controlled by the rotation of one of the driving wheels whereby an observer can see at a glance whether the speed laws are violated.

Another object of the invention is to provide a series of incandescent lamps each denoting a number of miles operated by a governor and made to light in succession when the speed of the vehicle increases.

The invention resides more particularly in the novel combinations hereinafter described and claimed reference being made to the accompanying drawing in which:

Figure 1 represents a side elevation of an automobile showing the speedometer case partly in section.

Figure 2 is a rear view of the same showing the cover of the case partly broken.

Figure 3 is a horizontal section of the governor on a larger scale.

Figure 4 is a front elevation of a modified form of governor.

Figure 5 is a diagram of the electrical connections.

In the drawing is shown an automobile having front and rear wheels 6 which are propelled by a motor as is well known. On the front wheel is fixed a gear ring 7 which is engaged by a pinion 8 coupled to a universal or flexible shaft 9 extending to the rear of the body of the car.

At the rear of the body of the car is secured a casing having a back 10 and a cover 11 the lower portion of which is provided with a glass front 12 with numerals thereon denoting the number of miles and each numeral can have a different colored glass. A series of incandescent lamps 14 are arranged in the casing behind the glass one being in a line with each division. As shown the miles are divided into blocks of five and each division is provided with a lamp. The casing while shown fastened at the back of the car could be located in any other place, for example, on the dashboard in front of the car.

A governor including a tubular transmission shaft 15 is coupled to the rear end of the flexible shaft. A toothed spindle 16 is slidingly arranged in the shaft and the teeth thereof are engaged by pinions 17 journalled in ears or lugs connected to the tubular shaft. A weight 19 is suspended from each pinion and is made to swing centrifically when the tubular transmission shaft is rotated. The tubular shaft is journalled in bearings 20 fixed to the back of the casing. When the driving wheel is in action the weights fly away from the axis of the tubular shaft and the pinions oscillate to move the toothed spindle forward. The governor is preferably arranged horizontally in order to conserve space, but it could be placed vertically as indicated in Figure 4 and the tubular shaft connected to bevelled gears 21 made to rotate the shaft.

The devices for energizing the incandescent lamps consists of a lever 22 made to press against the end of the toothed spindle by the contraction of a coiled spring 24 secured to the lever and the casing. The spring normally pushes the lever against the toothed spindle and the weighted pinions being always in mesh with the teeth on the spindle prevent the weights from gravitating when out of action. To the upper end of the lever is linked a rack 25 guided in supports 26 secured to the back of the casing. The rack engages a pinion 27 fastened to an oscillating contact arm 28 suitable to coact with a series of contacts 29 fixed to the back of the casing. The movement of the weights of the governor depending on the speed of the car thus controls the oscillation of the contact arm. The electrical connections for energizing each lamp independent of the other are shown in Figure 5. The current is generated by a storage or other battery 30 carried by the car and wires 31 and 32 connected respectively to the oscillating arm or its staff and the lamps lead the current from the battery. Each contact device is independently connected by a wire 33 with a lamp and a knife switch 34 within reach of the operator closes or opens the circuit. When the arm is oscillated it engages the first contact device denoting five miles and the current flows from the battery to wire 32 to the first lamp, thence to wire 33 to the contact and back to the battery through wire 31 connected to the arm.

I claim:

1. A speedometer comprising a casing having indicia denoting the number of miles a vehicle is traveling, a series of contacts, electric lamps located behind the indicia each connected to a contact, a tubular transmission shaft mounted in the casing for connection with a driving mechanism, a spindle sliding in the shaft, means carried by the shaft to automatically control the movement of the spindle by the speed of the driving mechanism, a spring pressed lever pushing against one end of the spindle, a rack pivoted to one end of the lever, a pinion engaged by the rack, and an arm fixed to the pinion to coact in succession with each of the contacts to light any one of the lamps.

2. A speedometer comprising a casing having indicia denoting the number of miles a vehicle is traveling, a series of contacts, electric lamps located behind the indicia each connected to a contact, a tubular transmission shaft mounted in the casing for connection with a driving mechanism, a toothed spindle sliding in the shaft, weighted gears pivoted to the shaft to automatically control the movement of the spindle by the speed of the driving mechanism, a spring pressed lever pushing against one end of the spindle, a rack pivoted to one end of the lever, a pinion engaged by the rack, and an arm fixed to the pinion to coact in succession with the contacts to light any one of the lamps.

In testimony whereof I have hereunto set my hand in the presence of two subscribing witnesses.

BARNEY GOLDMAN.

Witnesses:
INEZ M. SCHOMBS.
WILLIAM MILLER.